US008130777B2

(12) United States Patent
Friedman et al.

(10) Patent No.: US 8,130,777 B2
(45) Date of Patent: Mar. 6, 2012

(54) LINK LAYER DEVICE WITH CLOCK PROCESSING HARDWARE RESOURCES SHARED AMONG MULTIPLE INGRESS AND EGRESS LINKS

(75) Inventors: Robert Friedman, Jamison, PA (US); Hong Wan, Phillipsburg, NJ (US)

(73) Assignee: Agere Systems Inc., Allentown, PA (US)

( * ) Notice: Subject to any disclaimer, the term of this patent is extended or adjusted under 35 U.S.C. 154(b) by 1532 days.

(21) Appl. No.: 11/442,507

(22) Filed: May 26, 2006

(65) Prior Publication Data

US 2007/0274348 A1 Nov. 29, 2007

(51) Int. Cl.
*H04L 12/56* (2006.01)
(52) U.S. Cl. .............................. 370/419; 710/25; 710/58
(58) Field of Classification Search .................. 370/229, 370/230, 230.1, 231, 235, 498, 503, 516, 370/517, 518; 710/25, 58
See application file for complete search history.

(56) References Cited

U.S. PATENT DOCUMENTS

| 6,512,616 | B1* | 1/2003 | Nishihara | 398/54 |
| 6,785,290 | B1* | 8/2004 | Fujisawa et al. | 370/419 |
| 7,006,536 | B1* | 2/2006 | Somashekhar et al. | 370/538 |
| 7,366,270 | B2* | 4/2008 | Tang et al. | 375/372 |
| 7,421,048 | B2* | 9/2008 | Ducharme et al. | 375/354 |
| 7,511,582 | B2* | 3/2009 | Yin | 331/36 C |
| 2002/0044620 | A1* | 4/2002 | Spijker et al. | 375/371 |
| 2003/0185330 | A1* | 10/2003 | Hessel et al. | 375/376 |
| 2004/0131058 | A1* | 7/2004 | Ghiasi | 370/389 |
| 2004/0258099 | A1* | 12/2004 | Scott et al. | 370/503 |
| 2005/0005021 | A1* | 1/2005 | Grant et al. | 709/232 |
| 2005/0138259 | A1 | 6/2005 | Khan et al. | |
| 2005/0169298 | A1 | 8/2005 | Khan et al. | |
| 2005/0271389 | A1* | 12/2005 | Somashekhar | 398/140 |
| 2006/0126993 | A1* | 6/2006 | Piede et al. | 385/14 |
| 2006/0153179 | A1* | 7/2006 | Ho et al. | 370/386 |
| 2006/0159130 | A1* | 7/2006 | Den Hollander et al. | 370/503 |

OTHER PUBLICATIONS

Agere Systems, Product Brief, "Edge/Access and Multiservice Network Processors: APP550 and APP530," pp. 1-4, May 2003.
Implementation Agreement: OIF-SPI3-01.0, "System Packet Interface Level 3 (SPI-3): OC-48 System Interface for Physical and Link Layer Devices," Optical Internetworking Forum, pp. 1-42, Jun. 2000.

* cited by examiner

*Primary Examiner* — Ricky Ngo
*Assistant Examiner* — Wei-Po Kao
(74) *Attorney, Agent, or Firm* — Ryan, Mason & Lewis, LLP

(57) ABSTRACT

In a communication system comprising a link layer device connectable to one or more physical layer devices, the link layer device is configured using an efficient shared architecture for processing data associated with a plurality of links including at least one ingress link and at least one egress link. The link layer device comprises an ingress data clock processor configured to generate an ingress clock signal for processing data associated with said at least one ingress link, an egress data clock processor configured to generate an egress clock signal for processing data associated with said at least one egress link, and a control and configuration unit shared by the ingress data clock processor and the egress data clock processor. Another aspect of the invention relates to a buffer adaptive processor that in an illustrative embodiment limits clock variability in the presence of cell delay variation or cell loss.

20 Claims, 12 Drawing Sheets

210

$$H(z) = \frac{\Phi_o(z)}{\Phi_i(z)} = \frac{F(z)}{1 + F(z)}$$

$$F(z) = \frac{\Phi_o(z)}{\Phi_e(z)} = \left(\text{SCALE} + \frac{1}{1 - z^{-1}}\right)\left(\frac{1/\text{GAIN}}{1 - z^{-1}}\right)$$

$$\text{SCALE} = \frac{F_s 2\zeta}{\omega_n} \qquad \text{GAIN} = \frac{F_s^2}{\omega_n^2}$$

$F_s$ SAMPLING FREQUENCY   $\omega_n$ BANDWIDTH   $\zeta$ DAMPING FACTOR

234

LINK LAYER DEVICE WITH CLOCK PROCESSING HARDWARE RESOURCES SHARED AMONG MULTIPLE INGRESS AND EGRESS LINKS

FIELD OF THE INVENTION

The present invention relates generally to communication devices for use in network-based communication systems, and more particularly to clock processing in a link layer processor or other type of link layer device.

BACKGROUND OF THE INVENTION

A link layer processor is one example of what is more generally referred to herein as a link layer device, where the term "link layer" generally denotes a switching function layer. Such link layer devices can be used to implement processing associated with various packet-based protocols, such as Internet Protocol (IP) and Asynchronous Transfer Mode (ATM).

Communication between a physical layer device and a link layer processor or other type of link layer device may be implemented in accordance with an interface standard, such as the SPI-3 interface standard described in Implementation Agreement OIF-SPI3-1.0, "System Packet Interface Level 3 (SPI-3): OC-48 System Interface for Physical and Link Layer Devices," Optical Internetworking Forum, 2001, which is incorporated by reference herein.

A given physical layer device may comprise a multiple-port device which communicates over multiple channels with the link layer device. Such communication channels, also commonly known as MPHYs, may be viewed as examples of what are more generally referred to herein as physical layer device ports. A given set of MPHYs that are coupled to a link layer device may comprise multiple ports associated with a single physical layer device, multiple ports each associated with one of a plurality of different physical layer devices, or combinations of such arrangements. As is well known, a link layer device may be advantageously configured to detect backpressure for a particular MPHY via polling of the corresponding MPHY address on its associated physical layer device. The detected backpressure is used by the link layer device to provide flow control and other traffic management functions, thereby improving link utilization.

U.S. Patent Application Publication No. 2005/0005021, published Jan. 6, 2005 in the name of inventors K. S. Grant et al. and entitled "Traffic Management Using In-band Flow Control and Multiple-rate Traffic Shaping," commonly assigned herewith and incorporated by reference herein, discloses improved techniques for communicating information between a link layer device and a physical layer device, so as to facilitate backpressure detection and related traffic management functions, particularly in high channel count applications supporting a large number of ingress and egress links.

U.S. Patent Application Publication No. 2005/0138259, published Jun. 23, 2005 in the name of inventors A. Q. Khan et al. and entitled "Link Layer Device with Configurable Address Pin Allocation," commonly assigned herewith and incorporated by reference herein, provides an improved approach to allocating address bits to sub-buses of an interface bus between a physical layer device and a link layer device.

U.S. Patent Application Publication No. 2005/0169298, published Aug. 4, 2005 in the name of inventors A. Q. Khan et al. and entitled "Link Layer Device With Non-Linear Polling of Multiple Physical Layer Device Ports," commonly assigned herewith and incorporated by reference herein, provides improved polling techniques that overcome polling delay problems associated with fixed linear polling of a large number of MPHYs, while also avoiding the need for increased buffer sizes or additional interface pins. Generally, an efficient and flexible non-linear polling approach is provided which, in an illustrative embodiment, allows the polling sequence to be altered dynamically based on particular data transfers that are occurring between a link layer device and one or more physical layer devices in a communication system.

Despite the considerable advantages provided by techniques in the above-noted applications, further link layer device improvements are needed, particularly in terms of clock processing in a link layer processor or other link layer device.

For example, link layer processors developed for high channel count applications are typically designed to support a large number of ingress and egress links, each of which requires a phase-locked loop (PLL) clock recovery circuit. Thus, a separate instantiation of a PLL block with associated control and configuration registers would generally be required for each ingress and egress link. In addition, for a link layer processor in which Synchronous Residual Time Stamp (SRTS) processing capability is to be provided, each ingress and egress link typically has its own separate set of SRTS logic. Also, implementations using a buffer adaptive approach often require a very wide phase accumulator in order to accommodate the large cell delay variations associated with certain types of ATM traffic, such as ATM Adaptation Layer 1 (AAL-1) traffic. These and other issues lead to significant disadvantages in terms of excessive area and power requirements for the link layer processor. Moreover, the large phase transients caused by AAL-1 cell delay variations can lead to high PLL clock acquisition time and increased phase jitter.

Accordingly, what is needed is an area and power efficient architecture for implementing digital PLLs in high channel count link layer processors, in a manner that provides flexibility for accommodating various clock rates and clock transport mechanisms associated with ATM traffic, or other types of traffic such as time division multiplexed (TDM) traffic. Techniques are also needed for reducing PLL clock acquisition time and phase jitter.

SUMMARY OF THE INVENTION

An illustrative embodiment of the present invention overcomes one or more of the above-noted significant disadvantages of the prior art by providing link layer device clock signal generation techniques in which clock processing hardware resources are shared among multiple ingress and egress links.

In accordance with an aspect of the invention, a link layer device is configured for processing data associated with a plurality of links including at least one ingress link and at least one egress link. The link layer device includes an ingress data clock processor configured to generate an ingress clock signal for processing data associated with said at least one ingress link, an egress data clock processor configured to generate an egress clock signal for processing data associated with said at least one egress link, and a control and configuration unit shared by the ingress data clock processor and the egress data clock processor.

In an illustrative embodiment, the egress data clock processor is a single egress data clock processor configured to generate an egress clock signal for processing data associated with a set of egress links, for example, 28 egress links. The ingress data clock processor is one of a plurality of ingress data clock processors of the link layer device, such as three ingress data clock processors, with the three ingress data clock processors being configured to generate respective ingress clocks for processing data associated with respective sets of ingress links, for example, three sets of 28 ingress links each. It is to be appreciated, however, that the references to 28 egress links and sets of 28 ingress links in the foregoing examples and elsewhere herein are merely for illustrative purposes, and should not be construed as limiting the scope of the invention in any way. A wide variety of other arrangements of numbers, sets and types of links may be used in other embodiments of the invention.

In accordance with another aspect of the invention, the control and configuration unit comprises a scheduler configured to control update operations for numerically-controlled oscillators (NCOs) and other elements associated with digital PLLs in the ingress and egress data clock processors. The scheduler is shared by a plurality of instantiated arithmetic logic units which implement portions of the PLLs in the ingress and egress data clock processors. The arithmetic logic units process respective assigned ones of the ingress and egress links in a sequential fashion under control of the scheduler. A given one of the arithmetic logic units may comprise, for example, a state memory, an opcode decoder, an input NCO, a phase detector, and a loop filter. The scheduler in an illustrative embodiment utilizes a scheduling period divided into a plurality of link processing intervals each including multiple phase detector poll operations.

The control and configuration unit may further comprise a set of configuration registers for storing operation mode information and associated NCO or PLL parameter sets for each of the plurality of ingress links and the plurality of egress links, configuration mode select multiplexers adapted to provide simultaneous fetching of multiple parameter sets corresponding to respective ones of the ingress and egress links, and a set of pipeline registers adapted to receive the multiple parameter sets from the configuration mode select multiplexers.

In accordance with another aspect of the invention, at least one of the data clock processors comprises input NCOs that are operative in a fractional mode with rounding.

In accordance with a further aspect of the invention, at least one of the data clock processors comprises a phase-locked loop having a dual bandwidth loop configuration.

In accordance with yet another aspect of the invention, at least one of the data clock processors implements a loss of clock detection process which upon detection of a loss of clock inhibits PLL updates to prevent excessive output numerically-controlled oscillator drift.

An additional aspect of the invention relates to a buffer adaptive processor that in an illustrative embodiment limits clock variability in the presence of cell delay variation or cell loss. In accordance with this aspect of the invention, a link layer device configured for processing data associated with ingress and egress links comprises a plurality of data clock processors configured to generate respective clock signals for processing data associated with said ingress and egress links, and a buffer adaptive egress processor coupled to at least one of the data clock processors. The buffer adaptive egress processor is configured to generate a rate clock for at least one of the data clock processors, based on cells or other protocol data units associated with one or more of the links, in a manner that limits variation in the rate clock responsive to delay variation between the protocol data units or loss of one or more of the protocol data units.

The illustrative embodiments of the invention as described herein provide a number of significant advantages over the conventional techniques previously described. For example, extensive resource sharing in these embodiments allows the silicon area and power requirements associated with the link layer processor to be considerably reduced. Furthermore, clock acquisition and jitter performance, and robustness to clock loss, are substantially improved.

DETAILED DESCRIPTION OF THE INVENTION

The invention will be illustrated herein in conjunction with an exemplary network-based communication system which includes a link layer device, a physical layer device and other elements configured in a particular manner. It should be understood, however, that the invention is more generally applicable to any system in which it is desirable to provide enhanced efficiency and flexibility in implementing digital PLLs in a link layer device so as to accommodate a variety of clock rates and clock transport mechanisms.

A "link layer device" as the term is used herein refers generally to a link layer processor or other type of processor which performs processing operations associated with a link layer of a network-based system. Such a device may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

A "physical layer device" as the term is used herein refers generally to a device which provides an interface between a link layer device and a physical transmission medium of a network-based system.

Figure 1:
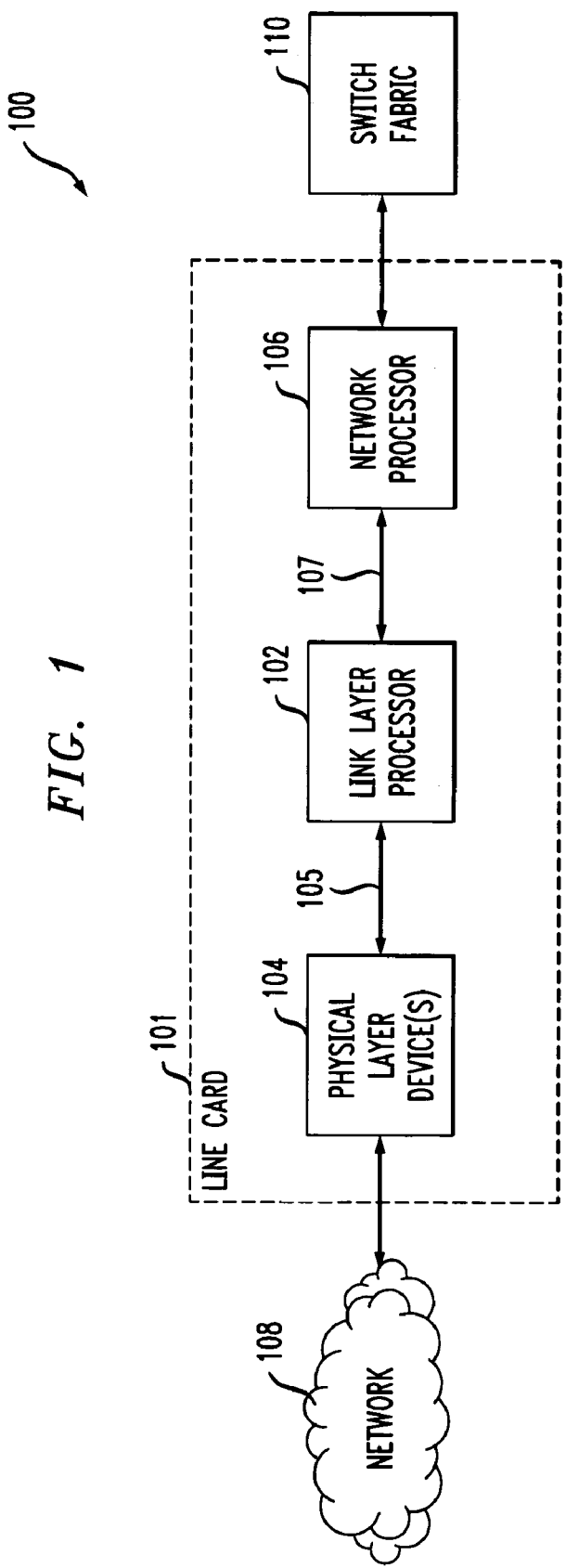
FIG. 1 is a block diagram of one possible implementation of a network-based communication system in accordance with an illustrative embodiment of the invention.

FIG. 1 shows a network-based communication system 100 in which the invention is implemented. The system 100 includes a link layer processor 102 coupled to one or more physical layer devices 104 via an interface 105. The physical layer device(s) 104 may comprise one or more devices suitable for providing access termination and aggregation for multiple services, or any other physical layer device of a type known to those skilled in the art.

The link layer processor 102 is also coupled to a network processor 106, via an interface 107. The network processor 106 may comprise, for example, a conventional network processor such as a PayloadPlus® network processor in the APP300, APP500 or APP750 product family, commercially available from Agere Systems Inc. of Allentown, Pa., U.S.A.

The link layer processor 102, physical layer device(s) 104, and network processor 106 in this illustrative embodiment are installed on a line card 101 of the system 100. The line card 101 is coupled between a network 108 and a switch fabric 110 of the system 100 as shown. The link layer processor 102 and network processor 106 are configured to communicate packets, cells or other protocol data units (PDUs) between the network 108 and the switch fabric 110 which controls switching of PDU data. The physical layer device(s) 106 serve to interface the link layer processor 102 to physical transmission media of the network 108, which may comprise optical fiber links or any other type of transmission media.

The interfaces 105 and 107 between the link layer processor 102 and respective elements 104 and 106 may comprise, for example, interface buses or other types of interfaces configured in accordance with the SPI-3 interface standard. Other standard interfaces, such as POS-PHY or UTOPIA interfaces, may also or alternatively be used. It is to be appreciated, however, that the invention does not require any particular type(s) of interface(s) between the link layer processor 102 and other system elements.

It should be noted that the invention is not limited to use with any particular type of link layer processor, physical layer device(s) or network processor. Numerous such elements suitable for use with the present invention are well known to those skilled in the art. The conventional aspects of these and other system elements will therefore not be described in detail herein.

Although the link layer processor 102 and network processor 106 are shown as separate elements in this illustrative embodiment, other embodiments may combine the functionality of the link layer processor and the network processor into a single link layer device. The general term "link layer device" as used herein is thus intended to encompass devices which incorporate at least a portion of the functionality commonly associated with a network processor.

For example, a given link layer device may be configured to provide flow control, traffic shaping and other functions. It may include an internal memory, as well as an interface to an external memory. Such memory elements may be utilized for implementing PDU buffer memory, queuing and dispatch buffer memory, etc. The link layer device may further include one or more memory controllers, as well as appropriate interface circuitry for interfacing with the physical layer device(s) 104, the switch fabric 110, and other external devices, such as a host processor which may be configured to communicate with the link layer device over a standard bus architecture, e.g., a peripheral component interconnect (PCI) bus. The link layer device may also include a scheduler, queuing and dispatch logic, as well as other conventional elements not explicitly shown in the figure. The operation of these and other conventional elements, being well understood by those skilled in the art, is not described in detail herein.

The physical layer device(s) 104 may comprise a plurality of queues, including ingress queues and egress queues, as well as appropriate interface hardware for interfacing with the link layer processor 102 and network 108. For example, a given physical layer device may comprise an optical transceiver for interfacing with an optical transmission medium of the network 108. Numerous alternative interfacing arrangements are possible. It is also possible that, in other embodiments, a given link layer device may itself incorporate one or more physical layer devices. Thus the physical layer device(s) need not be separate from the link layer device as in the FIG. 1 embodiment.

In describing the illustrative embodiment, it will be assumed that the term "ingress" refers to a direction of data transfer from the network 108 to the switch fabric 110. Similarly, it will be assumed that the term "egress" refers to a direction of data transfer from the switch fabric 110 to the network 108. It should be understood that these and other assumptions made herein are for clarity and simplicity of description only, and should not be construed as limitations of the invention. The terms "ingress" and "egress" as used herein thus do not refer to particular fixed directions, but instead may be viewed as arbitrary input and output data flow directions in a particular system implementation.

It should also be noted that the particular arrangement of system elements shown in FIG. 1 is by way of illustrative example only. More particularly, the invention can be implemented in any type of system having at least one link layer device, and is not limited to the particular processing applications described herein. The system 100 may include other elements in addition to or in place of those specifically shown, including one or more elements of a type commonly found in a conventional implementation of such a system.

As noted above, link layer processors developed for high channel count applications are typically designed to support a large number of ingress and egress links, each of which requires a PLL clock recovery circuit. Conventional arrangements are inefficient in terms of their area and power requirements, and exhibit other drawbacks such as unduly high PLL acquisition time and phase jitter. The illustrative embodiment overcomes these and other significant disadvantages of the prior art by providing link layer device clock signal generation techniques in which clock processing hardware resources are shared among multiple ingress and egress links.

Figure 2:
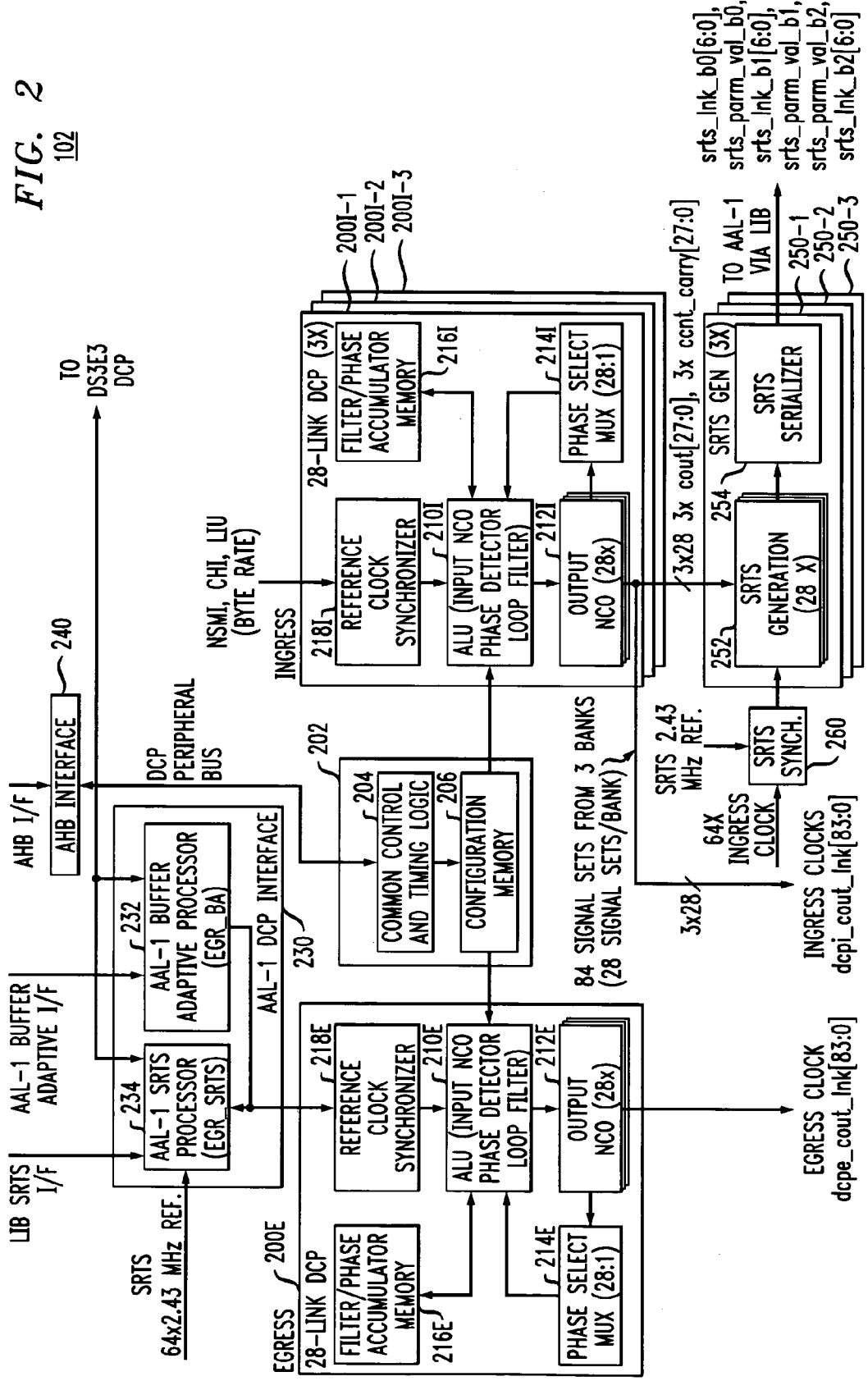
FIG. 2 is a block diagram showing a portion of a link layer processor of the FIG. 1 system.

FIG. 2 shows a portion of the link layer processor 102 of the FIG. 1 system as configured to provide the desired improvements in clock signal generation. The link layer processor 102 in this embodiment is configured for processing data associated with multiple ingress and egress links. More specifically, this embodiment supports 84 ingress links and 28 egress links, although different numbers of ingress and egress links can of course be used in other embodiments. The link layer processor 102 includes three 28-link ingress data clock processors (DCPs) denoted 200I-1, 200I-2 and 200I-3, and a 28-link egress DCP denoted 200E. The ingress DCPs and egress DCP generate respective ingress and egress clock signals for processing data associated with the respective ingress and egress links. The link layer processor 102 further comprises a control and configuration unit 202 that is shared by the ingress DCPs 200I-1, 200I-2 and 200I-3 and the egress DCP 200E. The shared control and configuration unit 202 comprises a common control and timing logic unit 204 and configuration memory 206.

Also included in the link layer processor 102 is an advanced high-performance bus (AHB) interface element 240. This element is coupled to a DCP peripheral bus as shown.

The portion of the link layer processor 102 shown in FIG. 2 may communicate with other DCPs that are not shown, for example, one or more DS3/E3 DCPs. Such other DCPs may be configured in a manner similar to that of the DCPs that are shown in the figure.

It is to be appreciated that the particular signaling arrangements used in FIG. 2 and other figures herein are presented by way of illustrative example. The signals as shown in the figures generally use naming conventions that are indicative of their respective functions. For example, signals with names including "dcpe" are associated with an egress DCP, signals with names including "dcpi" are associated with an ingress DCP, signals with names including "ba" or "BA" are associated with buffer adaptive processing, signals with names including "srts" are associated with SRTS processing, signals with names including "cnfg" are associated with configuration information, signals with names including "cnt" are associated with counts, signals with names including "link" or "lnk" are associated with particular links, signals with names including "upd" are associated with updates, signals with names including "val" are associated with values, signals with names including "sel" are associated with selection operations, and so on. Also, brackets following a particular signal name denote the number of bits in the signal, for example, [n:0] denotes a signal comprising n+1 bits. Those skilled in the art will readily understand the various signals identified in the figures and will also recognize that other types and arrangements of signals and associated processing elements and interconnects may be used in implementing the invention.

Figure 3:
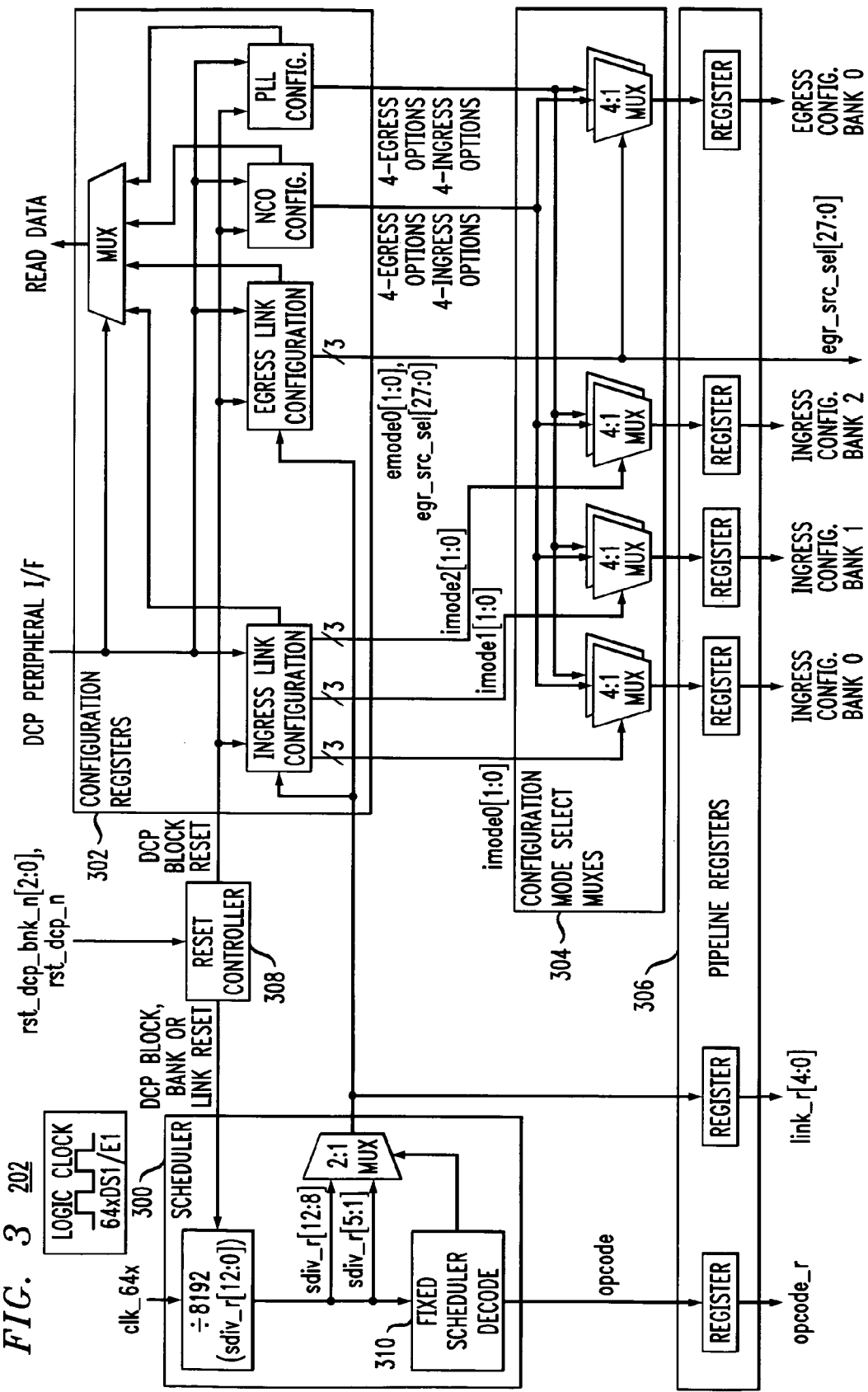
FIG. 3 shows a control and configuration unit shared by ingress and egress data clock processors in the link layer processor of FIG. 2.

FIG. 3 shows a more detailed view of the control and configuration unit 202 shared by the ingress and egress DCPs 200 in the link layer processor 102. There unit 202 comprises four primary sub-blocks, namely, scheduler 300, configuration registers 302, configuration mode select multiplexers 304, and pipeline registers 306.

The circuitry shown in FIG. 3 receives a logic clock that is denoted herein as a 64× clock or simply clk_64×. As indicated in the inset in this figure and other figures herein, the clk_64× clock signal is 64 times the standard DS1 or E1 bit rate, where the DS1 and E1 bit rates are 1.544 Mbps and 2.048 Mbps, respectively.

The scheduler 300 determines when arithmetic logic units (ALUs) 210I and 210E in the respective ingress and egress DCPs 200 of FIG. 2 perform their basic input NCO, PLL loop filter, and output NCO update operations, as will be described in greater detail below in conjunction with FIG. 4. Sharing the scheduler between all instantiated ALUs significantly reduces area and power requirements of the link layer processor 102. The scheduler 300 also coordinates bank and power-up reset operations, in conjunction with the reset controller 308.

The configuration registers 302 in this illustrative embodiment comprise an ingress link configuration register, an egress link configuration register, an NCO configuration register, and a PLL configuration register. One of four different ingress modes of operation may be separately specified for each of the 84 ingress links associated with the three ingress ALUs 210I-1, 210I-2 and 210I-3 of FIG. 2, the four different modes being denoted as the 4-Ingress Options in FIG. 3. Similarly, one of four different egress modes of operation may be separately specified for each of the 28 egress links associated with the single egress ALU 210E of FIG. 2, the four different modes being denoted as the 4-Egress Options in FIG. 3. Thus, there are a total of eight different modes of operation, four ingress and four egress, each having a corresponding NCO and PLL parameter set specified in the NCO and PLL configuration registers.

The configuration register arrangement utilized in control and configuration unit 202 substantially reduces the number of required NCO and PLL configuration registers, providing further improvements in area and power efficiency.

The architecture of the ALUs 210 allows simultaneous processing of three ingress links and one egress link. As indicated above, each ALU is assigned 28 links. More specifically, the three ingress ALUs 210I-1, 210I-2 and 210I-3 are each assigned 28 ingress links and the single egress ALU 210E is assigned 28 egress links. The ALUs process their assigned links in a sequential fashion as controlled by the scheduler 300.

As mentioned previously, the use of 28 egress links and sets of 28 ingress links in this illustrative embodiment is by way of example only. A wide variety of other arrangements of numbers, sets and types of links may be used in other embodiments of the invention.

The ALUs 210 may be viewed as being organized in banks in the following manner. There are two Bank 0 ALUs, one for ingress and the other for egress, which process ingress links 0-27 and egress links 0-27, respectively. The ingress and egress Bank 0 ALUs correspond to the above-noted ALUs 210I-1 and 210E, respectively. A single Bank 1 ALU processes ingress links 28-56, and a single Bank 2 ALU processes ingress links 57-83. These Bank 1 and Bank 2 ALUs are the above-noted ALUs 210I-2 and 210I-3.

Of course, this particular banking arrangement should be considered an example only, and other types of banking can be used in other embodiments. Thus, the invention is not limited in terms of the number and arrangement of ALU banks that may be used.

Since each link can have a separate operating mode, the configuration registers 302 and configuration mode select multiplexers 304 are designed to allow fetching of four NCO and PLL parameter sets at a time, three for ingress links and one for an egress link. Thus, the ingress link configuration register is used to identify three different ingress operating modes, denoted imode0[1:0], imode1[1:0], and imode2[1:0], one for each of the three ingress links, and the egress link configuration register is used to identify a single egress operating mode, denoted emode0[1:0], for the single egress link. These operating mode signals are applied as select signals to respective ones of four 4:1 multiplexers in the configuration mode select multiplexers 304, each of which receives as its inputs the four ingress options and four egress options of the NCO and PLL configuration registers. After the four parameter sets are fetched, they are stored along with the corresponding operation code (opcode) and link address in respective ones of the pipeline registers 306. The use of the pipeline registers 306 advantageously provides reduced decoding and memory access latencies.

The reset controller 308 has six reset sources, namely, one block level reset, three ingress bank-level resets, one egress bank-level reset, and a link-level reset. The block level reset, rst_dcp, resets configuration registers and the scheduler logic, and indirectly resets the ALU state memory. The bank-level resets provide the capability to reset DCP state memory on a bank basis. The bank-level resets are also asserted during power-on and block-level reset operations of the link layer processor 102 or may be asserted under software control via a reset control register. The bank-level and block-level resets are performed serially and are completed within 64 time periods of the clk_64× clock signal.

Figure 4:
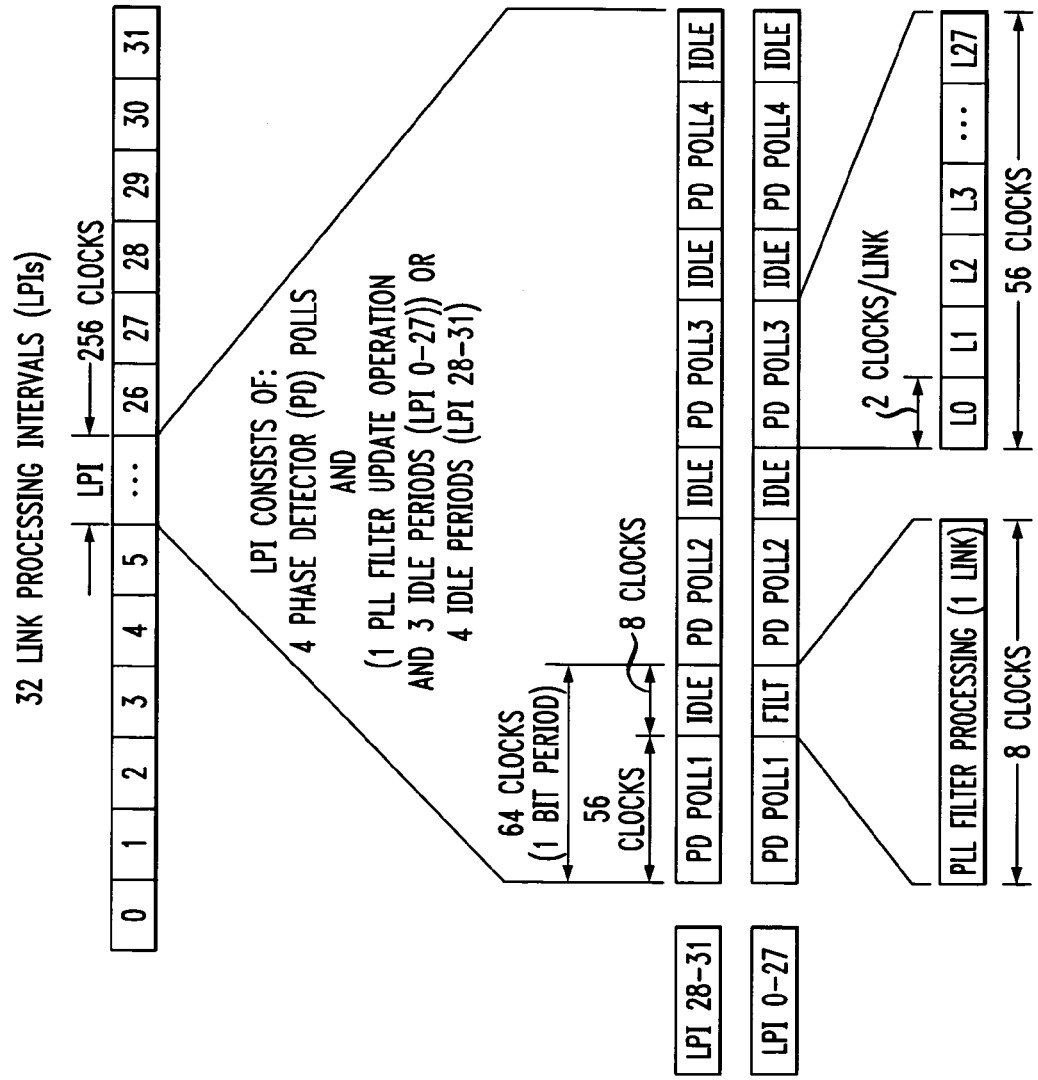
FIG. 4 is a diagram illustrating the operation of a scheduler in the shared control and configuration unit of FIG. 3.

FIG. 4 illustrates the operation of scheduler 300 in greater detail. The scheduler utilizes a simple decode of a 13-bit counter, sdiv_r[12:0], that is incremented by the clk_64× clock signal, which is 64 times the DS1 or E1 bit rate, where as noted above the DS1 and E1 bit rates are 1.544 Mbps and 2.048 Mbps, respectively. A scheduling period consists of 8192 periods of the clk_64× clock signal. The scheduling period is divided into 32 link processing intervals (LPIs), each comprising 256 periods of the clk_64× clock signal. During LPIs 0 through 27, each LPI consists of four phase detector polls and a PLL loop filter computation for a single link. During the 56-clock phase detector poll period, an input clock synchronizer is polled to see if a low-high clock transition has occurred. If it has, the corresponding ALU performs input NCO and phase detector operations that are described below. The phase detector poll operation is done at the bit rate for each of the 28 links.

Also during phase detector poll operations, the ALU performs output NCO phase adjustments, which effectively alters the frequency of the output NCO so that it matches the frequency of the input clock. Every fourth poll interval in LPI N, where $0 \leq N \leq 27$, the PLL loop filter computation is performed for link N. Since the loop filter calculation for a link is performed once per $2^{13}$ count cycle, the effective sampling rate of the filter is $64 \times BitRate/2^{13}$. This translates to a sampling rate of 12.0625 kHz for a DS1 configured link and 16 kHz for an E1 link.

For LPIs 28-31, the processing is similar to the case for LPIs 0-27, but there are four idle periods rather than three idle periods and a filter update operation, as illustrated in the figure.

The fixed scheduler decode block 310 decodes the 13-bit scheduler divider into a two-bit opcode that specifies one of four basic ALU operations: Phase Detector Poll (PDPOLL), Loop Filter Update (LFUPD), Link Reset (LNKRST), and No Operation (NOP). These opcodes are decoded in the ALU 210, as will now be described with reference to FIG. 5A. The PDPOLL opcode may be preempted with a LNKRST operation if a link, block (rst_dcp) or bank-level reset (rst_dcp_bnk [2:0]) reset operation is being performed.

Figure 5A:
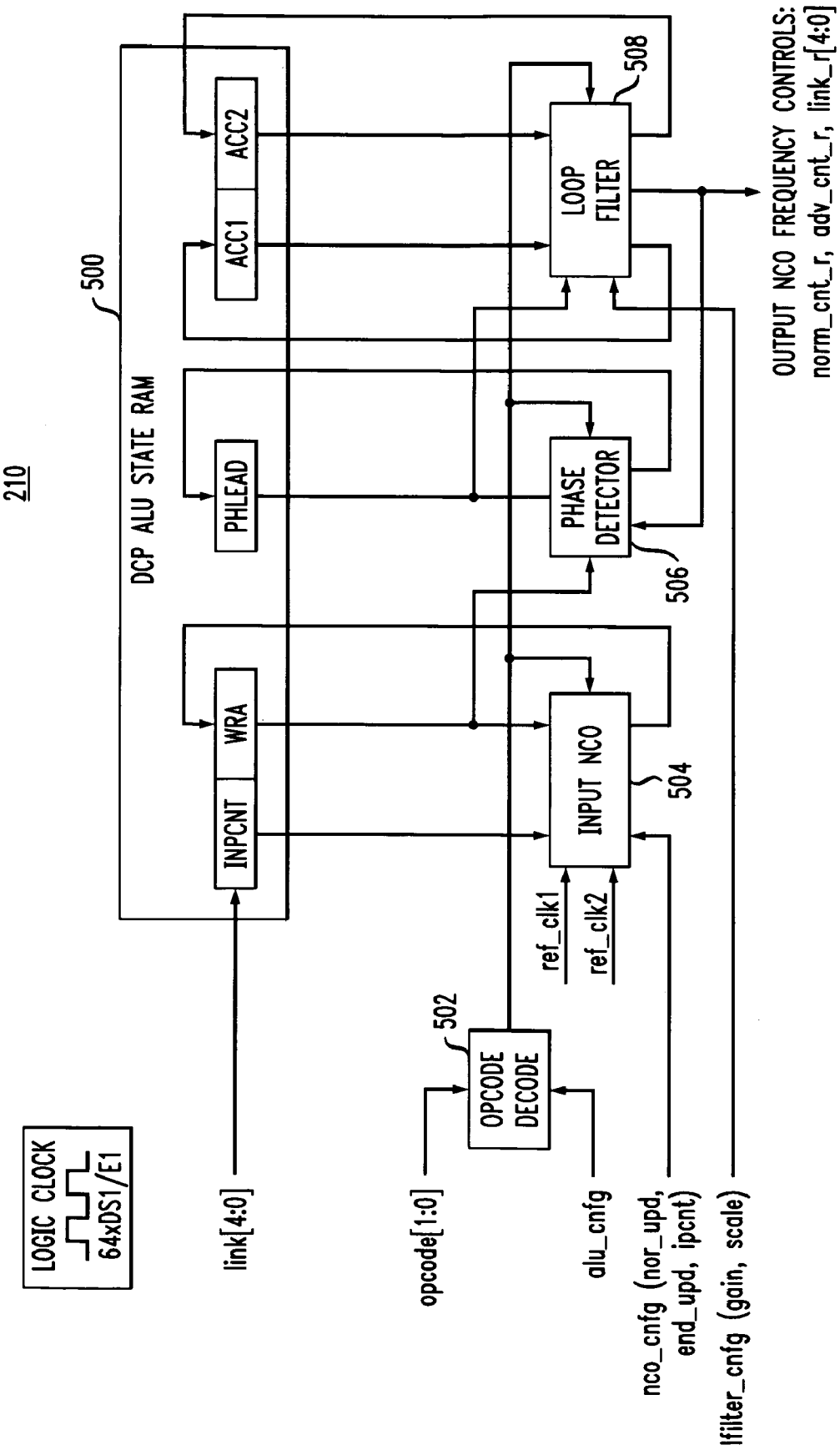
FIG. 5A shows an arithmetic logic unit of a given data clock processor in the link layer processor of FIG. 2.

FIG. 5A shows a given 28-link ALU 210 in a DCP 200 of the link layer processor 102. This particular ALU may be any one of the above-noted ingress or egress ALUs 210I or 210E. The 28-link ALU provides a common data path block for multiple digital PLLs. Low sampling rates are used to permit extensive resource sharing. As indicated above, the illustrative embodiment includes four ALU instantiations, to support 84 ingress links and 28 egress links. The ALU 210 advantageously supports SRTS, buffer adaptive, and TDM clock processing requirements.

The ALU 210 includes a state random access memory (RAM) 500, an opcode decoder 502, an input NCO 504, a phase detector 506, and a loop filter 508. The ALU 210 is coupled to a corresponding set of 28 output NCO elements 212 and a 28:1 phase select multiplexer 214 in DCP 200. The input NCO 504, phase detector 506, and loop filter 508 interpret the decoded opcodes from the opcode decoder 502. The input NCO 504 converts clock pulses to phase ramps. It may be operated in a fractional NCO with round mode in order to reduce phase ramp jitter to 1/64 UI for frequency conversion applications, thereby reducing output jitter. The loop filter 508 provides frequency controls to the output NCO elements 212. All output NCOs 212 are incremented at the 64× clock rate, however, only one of the 84 ingress output NCOs or one of the 28 egress output NCOs needs to respond to retard or advance requests from the loop filter.

As noted above, the input NCO 504 may be operated in a fractional NCO with rounding mode in order to reduce phase ramp jitter. This fractional NCO operation will now be described in greater detail with reference to FIGS. 5B and 5C.

Figure 5B:
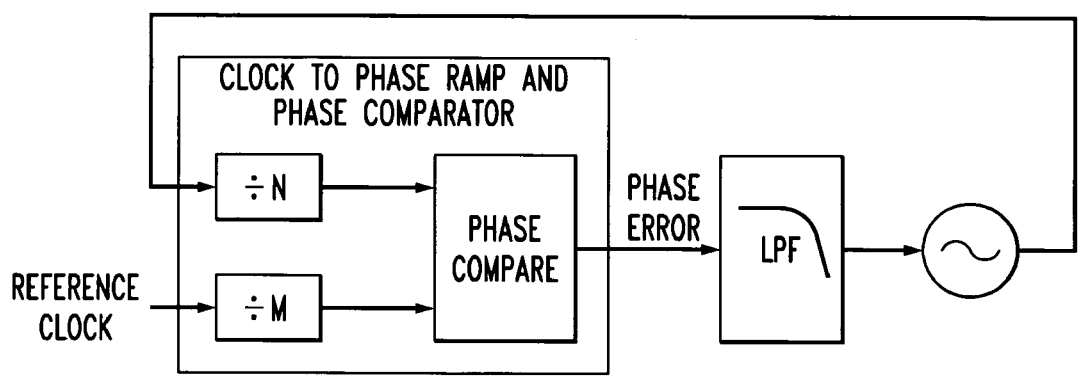
FIG. 5B is a diagram illustrating fractional operation of a phase-locked loop in the arithmetic logic unit of FIG. 5A.

The block diagram in FIG. 5B shows a PLL frequency multiplier in which the output clock frequency is (M/N) times the reference clock or $$Clk_{Out} = \frac{N * Clk_{ref}}{M}$$

The PLL frequency multiplier shown in the figure converts clock pulses to phase ramps which can be used for computing phase differences, in the following manner. We define a comparison interval consisting of exactly M reference clocks and N output clocks. For both clocks we need to generate a phase ramp which at the beginning of each interval starts at zero and ramps up to a binary value 2', where w is the width of the phase accumulator. There are two phase accumulators, one for the output clock and the other for the reference clock. A phase increment is added to the associated phase accumulator each time the associated clock transitions from a zero to a one. At the end of M reference clocks or N output clocks, the maximum value of the associated phase accumulator is reached. Therefore for each reference clock, the reference clock phase accumulator is incremented by $$\frac{2^w}{M}.$$

Similarly, for each output clock, the output clock phase accumulator is incremented by $$\frac{2^w}{N}.$$

The output of the phase accumulator represents the binary phase of the associated clock over the comparison interval.

A subtraction of the two phase accumulators represents the phase error which is used to feed the low pass filter and VCO to modulate the frequency of the output clock to eventually drive the phase error to zero. Once the phase error is driven to zero, the PLL has locked and the relationship $$Clk_{Out} = \frac{N * Clk_{ref}}{M}$$

is held. The difficulty that arises is that the phase increments are not always integer numbers. One way of handling this is to use one integer phase increment for the first M−1 (or N−1) clocks then use a second integer phase increment for the last clock. For example, the reference clock phase increment would be $$\frac{2^w}{M},$$

and the last increment would be the residual count $$2^w - M \left\lfloor \frac{2^w}{M} \right\rfloor,$$

where $\lfloor \ \rfloor$ denotes the floor function. The problem with this approach is that the clock to phase conversion during the comparison interval increases in error because of the flooring operation of the phase increment. This error is compensated for at the $M^{th}$ clock, however, this introduces jitter which must be filtered out by the PLL. This error can be reduced substantially to less than one integer bit, by using additional f fractional bits in the accumulator and using a fractional phase increment in the form $$\left\lfloor \frac{2^w}{M} 2^f \right\rfloor,$$

where f is determined such the residual error at the $M^{th}$ increment is less than unity. The total width of the phase accumulator of the fractional NCO is therefore w+f. At the last clock, the phase accumulator implements a round function such that at the $M^{th}$ phase increment the phase accumulator is loaded with $$\text{Phase\_Accum} = \text{round}\left(\text{Phase\_Accum} + \left\lfloor \frac{2^w}{M} 2^f \right\rfloor\right)$$

The round function is required because the frequency multiplication must be exactly N/M, otherwise data buffers which are clocked by the synthesized clocks will eventual over/underflow as the residual errors accumulate over time. Since the error correction at the last step is much smaller than unity, the resulting computational phase error correction results in significantly lower jitter than the integer increment and correction commonly used. The advantage with this approach is that the phase jitter from the phase compare operation is significantly reduced, resulting in jitter reduction in the synthesized output frequency. In addition, the exact rational frequency multiplication is maintained over time.

Figure 5C:
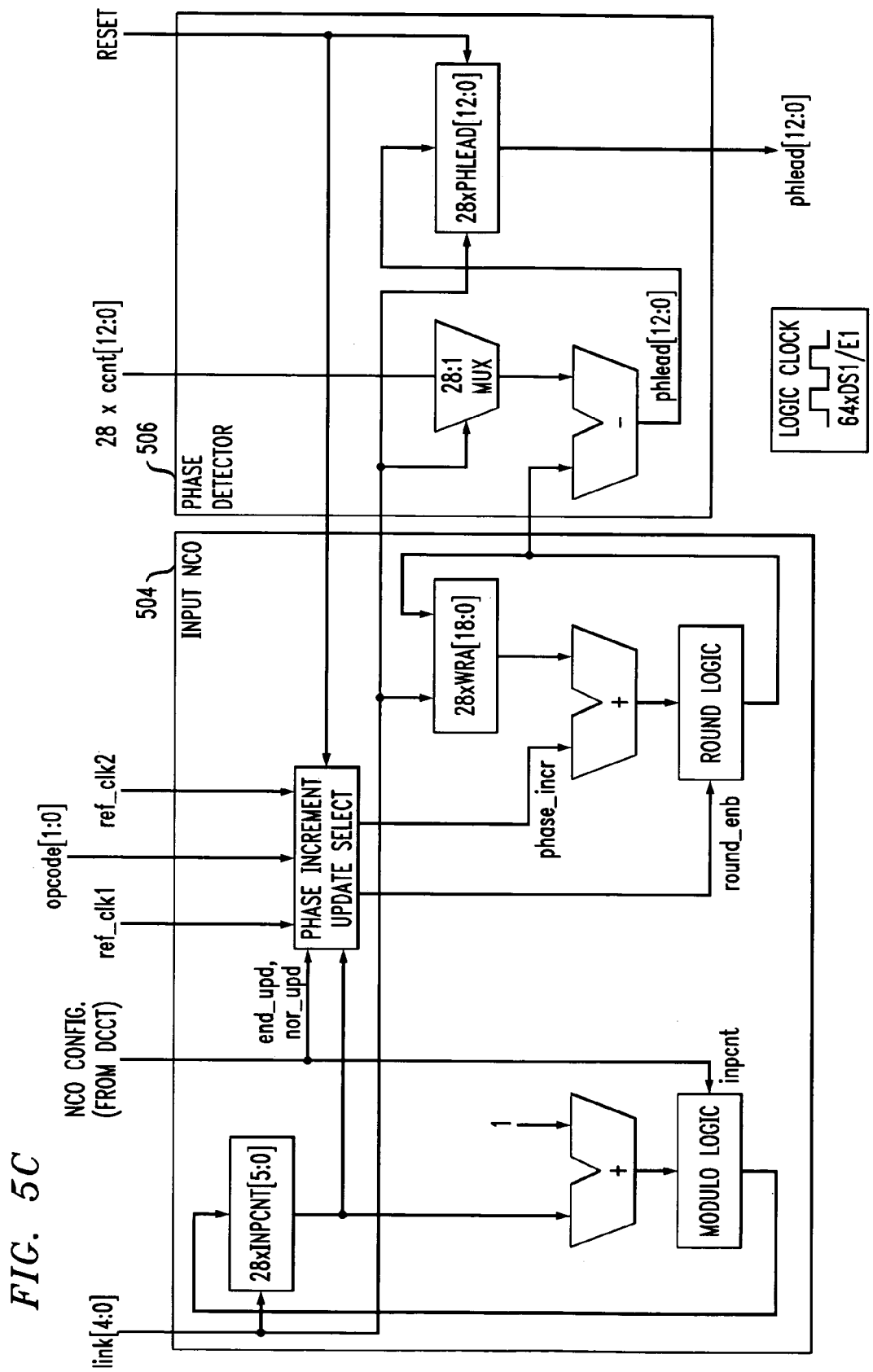
FIG. 5C shows a mode detailed view of an implementation of the fractional operation approach of FIG. 5B in the arithmetic logic unit of FIG. 5A.

Referring now to FIG. 5C, a block diagram of a system for servicing N clocks in the ALU 210 of FIG. 5A is shown. In this illustrative embodiment, the phase from the output clock is derived directly from a binary counter, which is essentially a phase accumulator with a unity phase increment. The output of this phase accumulator is the output clock reference, which is shown as the input to the phase detector 506.

The reference clock is derived from the data stream and a fractional NCO with ceiling logic is used to convert the input clocks to a phase ramp. The NCO configuration defines M, the length of the phase comparison interval. An input counter, INPCNT, is used to determine when the round operation takes place, i.e., at every $M^{th}$ reference input clock. The NCO configuration also has the fractional phase increment and a clock select bit to select one of two clock reference sources. The control input identifies which of the N link clocks is processed on the current cycle. The control block decodes the input count logic and control input to determine when a phase increment is added and when it is rounded to next highest integer (ceiling function).

The input NCO receives NCO configuration information from DCP common control and timing (DCCT), which illustratively comprises common control and timing logic 204 in the shared control and configuration unit 202 of FIGS. 2 and 3.

The input NCO 504 includes a set of N phase accumulators and round logic. The output of the round logic is stored in one of the N phase accumulators and passed to the phase detector 506 which performs the phase error subtract operation. The resulting phase error is stored in the phase error register file (1 register for each of N links) and passed to the PLL loop filter 508 through the phase error output.

The input NCO 504 processes reference clocks at the bit-clock rate for 28 links. Reference clock pulses may be generated, for example, by line interface unit (LIU), network serial multiplexed interface (NSMI), or AAL-1 Buffer Adaptive or SRTS interfaces. For LIU, NSMI, and AAL-1 Buffer Adaptive applications, one reference pulse (ref_clk1) is generated for every eight bits. For AAL-1 SRTS egress applications, reference clock pulses on the ref_clk2 are generated approximately once every thirty-two SRTS clocks—2.43 MHz clock, and once every 3008 bits on the ref_clk2 input. The SRTS egress application is the only application that uses the ref_clk2 input.

The input NCO and phase detector computation process is invoked whenever the PDUPD (Phase Detector Update) opcode is issued. State memory read operations occur during sub-cycle zero (SC=0) and memory write operations occur during sub-cycle one (SC=1).

The phase detector 506 computes the phase difference between the input NCO and output NCO. This computation is performed after the input NCO is updated and is computed using the current NCO output phase that is selected via a 28:1 multiplexer. This phase difference is computed during the poll process whenever an input clock (ref_clk1 or ref_clk2) is detected. The phase detector is a simple subtraction of the 13-bit NCO phase accumulator, CCNT[12:0], from the input NCO phase accumulator, WRA[12:0]. The result of the subtraction is stored in the PHLEAD memory to be used in a subsequent loop filter update. The subtraction produces the correct phase error if the carry is discarded and only the least significant 13 bits of the subtractor output are retained as illustrated from the following Verilog code example:

wire[12:0]phlead=wra[12:0]-ccnt[12:0];

It is important to note that phlead is scaled by $2^{13}$, as the implied decimal point of the unsigned phase accumulator is to the left of the most significant bit. The unscaled magnitude range of the phase is $0 \leq$ phase<1. The $2^{13}$ implicit scaling of the phlead is accounted for in all PLL computations. The phase is measured relative to the NCO phase accumulator cycle which consists of 128-bit (DS1/E1) periods. The phase accumulators in the input and outputNCOs wrap after 128 bit-periods of phase are accumulated. There are 64 counts of phase accumulated per bit period, providing a 1/64 UI system phase resolution.

A dual bandwidth loop configuration may be used in ALU 210 to provide rapid acquisition. Such a configuration can be achieved with single coefficient set using simple coefficient shift operations. Glitchless transition for high to low bandwidth may be accomplished with shift of the ACC1 and ACC2 state registers in state RAM 500.

Figure 5D:
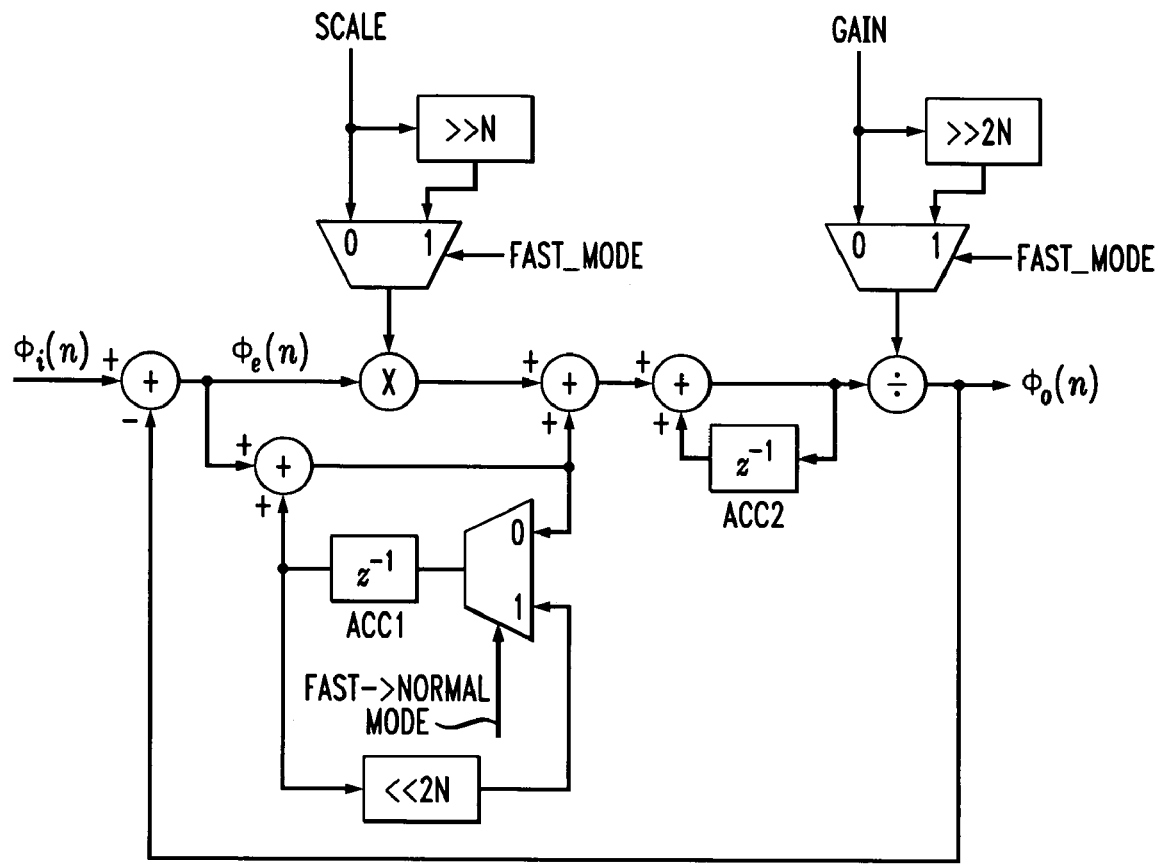
FIG. 5D illustrates the operation of a dual bandwidth loop filter in a phase-locked loop in the arithmetic logic unit of FIG. 5A.

FIG. 5D illustrates the operation of the dual bandwidth loop configuration. Users can specify loop filter characteristics (bandwidth and damping factor) by configuring Scale and Gain inputs shown at the top of the figure. However, for faster initial PLL acquisition, a wider bandwidth may be desired. By right shifting Gain by 2N and right shifting Scale by N, bandwidth is equivalently multiplied by $2^N$. This is done by setting a Fast_Mode bit. After a certain period of time, the PLL is in or close to the lock-in state, and the user may want to switch back to the original configured bandwidth for better jitter performance. Besides left shifting Gain and Scale back to their original values, ACC1 is left shifted by 2N to keep the PLL in the lock-in state. This is done by a self-clearing change Fast Mode command bit, as illustrated.

A loss of clock detector may be used to inhibit PLL updates and to prevent output NCO drift which can result in capture failures once clock is restored.

Figure 5E:
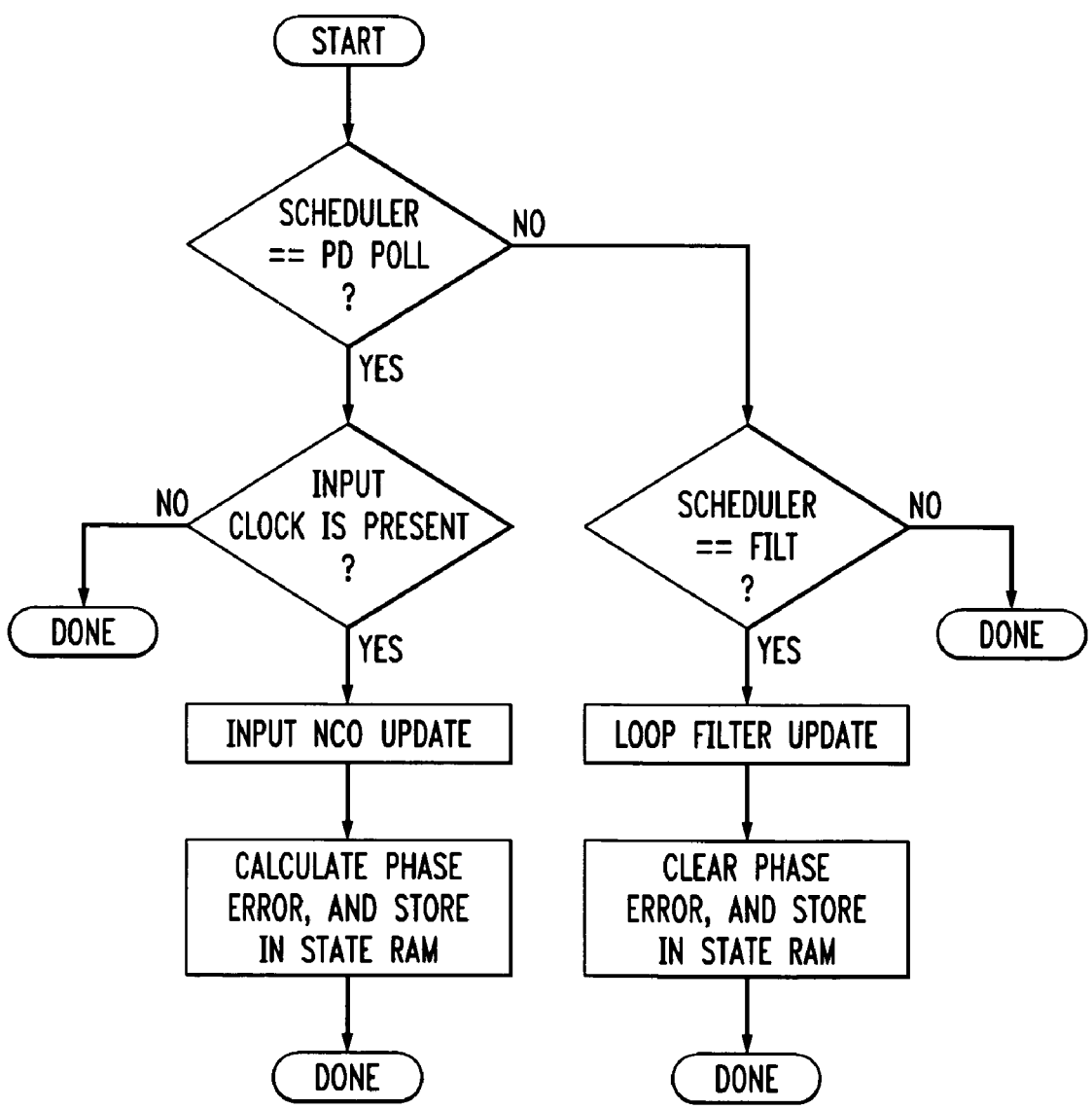
FIG. 5E is a flow diagram of a loss of clock detection process implemented in the arithmetic logic unit of FIG. 5A.

FIG. 5E shows a flow diagram of the loss of clock detector. This is implemented by clearing phase error every time after the loop filter accumulators update. If clock is present, phase error will be updated in the phase detection stage, which happens much more frequently than the loop filter update stage. Therefore before the next loop filter update, the correct value of the phase error will be used for filter update; if clock is absent, phase error won't be updated, and then the next loop filter update will use a phase error of zero and keep the accumulator the same, i.e., keep the PLL in the current state instead of allowing it to drift away.

Figure 6:
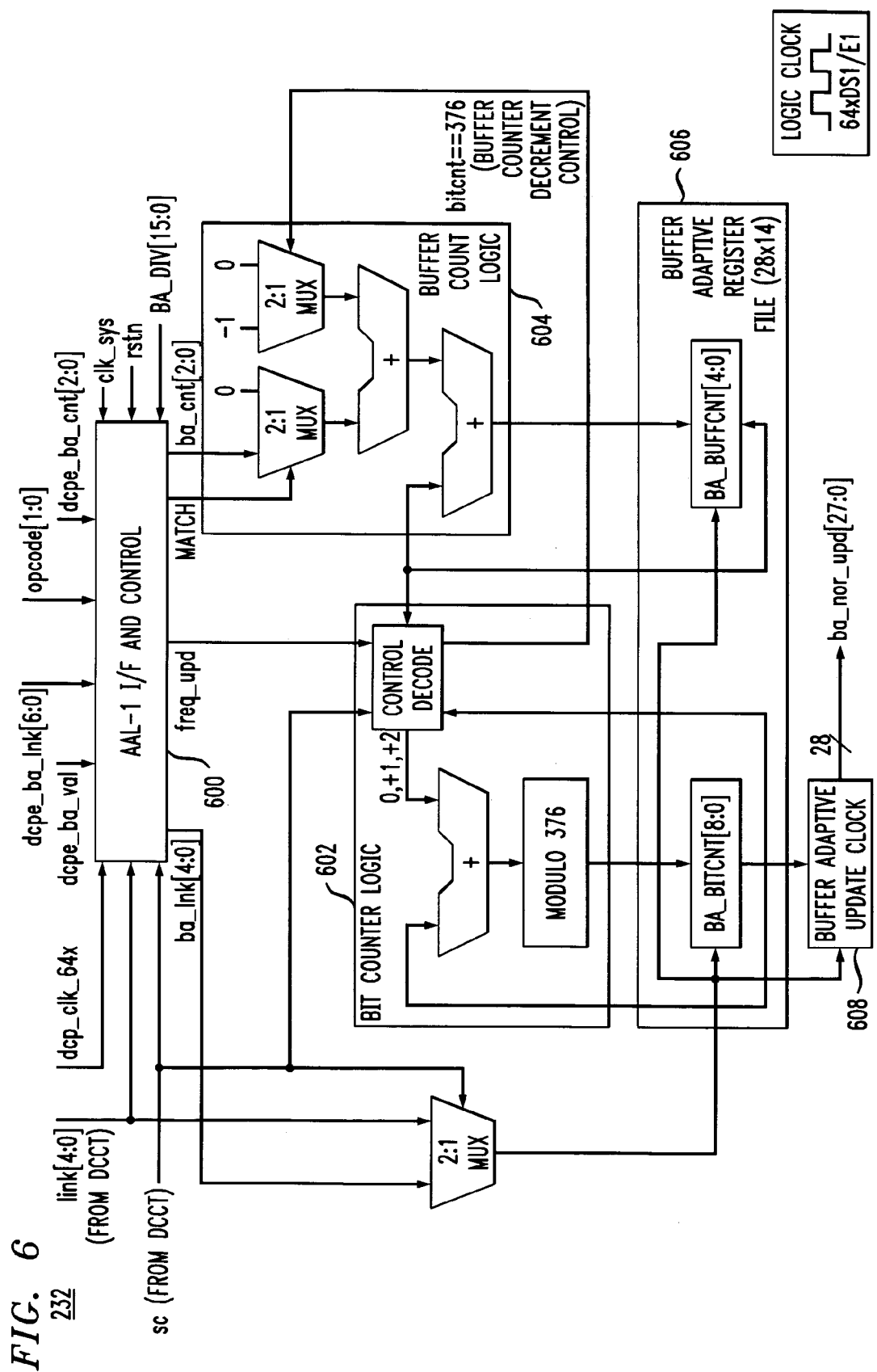
FIG. 6 shows a buffer adaptive egress processor in the link layer processor of FIG. 2.

FIG. 6 shows a more detailed view of the buffer adaptive egress processor 232 in the link layer processor 102 of FIG. 2. The processor 232 comprises an AAL-1 interface and control element 600, bit counter logic 602, buffer count logic 604, a 28×14 buffer adaptive register file 606, and a buffer adaptive update clock 608. Element 600 provides an interface to an otherwise conventional AAL-1 processor, which is not shown in the figure, and byte clocks are synthesized from an AAL-1 cell receive clock. The operation of a conventional AAL-1 processor is well understood by those skilled in the art and therefore not described in detail herein.

The processor 232 implements a buffer adaptive filter using a FIFO type phase detector and a frequency constrained synthesized byte clock, which reduces the required digital PLL loop filter fixed-point widths, thereby saving area and power. This also improves de-jitter performance as byte clock frequency limits restrict PLL drift in the event of high CDV traffic or lost cells. The clock frequency limits are configurable and may be based on a priori knowledge of transmit and receive clock tolerances. The synthesized byte clock allows a uniform byte-level interface for all DCP operating modes.

In the buffer adaptive clock recovery mode, the AAL-1 processor signals to the buffer adaptive egress processor 232 that a 376-bit ATM cell has been received on link N. ATM cell processing has two issues which complicate clock recovery processing in order to produce a frequency locked low-jitter reference clock to be used by a line interface block (LIB) interface. These issues are a CDV of ±128 μsecs and the requirement to be sufficiently robust to operate when multiple (e.g., up to seven) consecutive ATM cells are lost. Both of the above-mentioned conditions result in a high jitter reference clock that can be filtered, without additional logic, using a PLL with a very low-frequency (e.g., sub-Hertz) passband. However, there are two problems with narrow PLL passbands. First, the frequency acquisition process is inversely proportional to loop bandwidth and therefore a very low-bandwidth loop will result in a long frequency acquisition process. A long frequency acquisition process requires larger ATM cell buffers resulting in a longer start-up delay and greater path-length delays. Secondly, the DSP realization for narrow filters requires large multiplier, adder, and accumulator widths.

The buffer adaptive egress processor 232 overcomes these two problems by providing a pre-filtering operation that minimizes input jitter of the reference clock sourced to the PLL clock recovery block. The processor 232 synthesizes a byte rate clock for each of the 28 links it supports. The frequencies of these clocks are modulated, to match the bit-rate clock of the source, using a rudimentary frequency lock-loop that is discussed below. The local byte-rate frequency lock loop minimizes the impact of CDV and lost cell pulses on the reference clocked sourced to the downstream PLL, facilitating the synthesis of, for example, a minimal jitter LIB LIU/NSMI clock source.

The buffer adaptive egress processor 232 operates at 64× the bit clock rate that is either 64×DS1 or 64× E1 rate. The AAL-1 buffer adaptive interface in element 600 interfaces the buffer adaptive egress processor 232 to the AAL-1 processor and provides the configuration interface to the DCP peripheral bus for programming the buffer adaptive (BA) link map memory. A portion of this interface may operate at the system clock rate.

There are two clk_64× clocks per link. The PDUPD scheduler intervals are reserved for bit clock generation, and the IDLE scheduler periods are reserved for AAL-1 event processing. Up to four buffer adaptive AAL-1 events can be processed during this 8 clock interval. The link reset function is identical to that used in the DCP ALU.

The frequency of phase compensation updates is regulated to prevent output NCO drifts in the absence of buffer adaptive receive pulses. A programmable modulo M counter in the control block 600 is incremented at the bit rate. The modulo of the counter can be programmed via the BA_DIV[15:0] field of the DCP configuration register. When the counter reaches its terminal count, the freq_upd (frequency update) signal is asserted for one bit clock period. When the freq_upd signal is asserted, the bit counter logic 602 will adjust the increment value of the BITCNT to either retard or advance the clock based upon the state of the associated BUFFCNT. If BUFFCNT is greater than zero, than the locally synthesized clock lags the source clock and an advance increment value (e.g., two) is used to increment the BITCNT for the current cycle. If the BUFFCNT is less than zero, then the locally synthesized clock lags the source clock and the BITCNT is retarded by using a zero increment value for the current cycle. If the BUFFCNT is zero or if the freq_upd is not asserted, then the BITCNT is incremented by one. Thus the increment process advances or retards the BITCNT by +1 bit period every M bit periods. The frequency of updates is equal to (DS1 or E1)/M. The effective pull range of the synthesized byte clock is ±$10^6$/M ppm.

The AAL-1 buffer adaptive interface in element 600 is a simple one way interface. When an ATM buffer is received, the AAL-1 processor posts the link number and buffer count onto the dcpe_balink[6:0] and dcpe_ba_cnt[2:0] buses, and asserts the buffer valid signal, dcpe_ba_val, to indicate a buffer adaptive event is available to be processed. The interface synchronizes dcpe_ba_val to the local clk_64× clock and upon synchronization, captures the contents of dcpe_ba_link and dcpe_ba_cnt into a register. After a minimum of eight system clocks (clk_sys), the AAL-1 processor may release the dcpe_ba_val signal and may change the contents of the dcpe_ba_link and dcpe_ba_cnt buses. The AAL-1 processor may not assert dcpe_ba_val signal until 60 clk_sys cycles have elapsed relative to the previous assertion the dcpe_ba_val signal. A look-map is provided to bind the 7-bit logical link number sourced on the dcpe_balink[6:0] bus to one of the 28 buffer adaptive pre-filters provided by the buffer adaptive egress processor 232.

It should be noted that concentration highway interface (CHI) frequency synthesis from 1.544 MHz sources can be supported with the addition of a 64×2.048 MHz DCP ALU block. No modifications are required in the buffer adaptive pre-filter to support this operation.

It may be more efficient in certain applications to use a different implementation based on a FIFO watermark in the AAL-1 processor, instead of separately counting cell events as in the above-described embodiment. More particularly, this FIFO watermark approach reports the state of the FIFO relative to its midpoint fullness or other type of watermark. So instead of reporting the cells received, the state of the FIFO (e.g., at midpoint, less than midpoint or greater than midpoint) is reported whenever a cell is processed by the LIU. Other types of buffer pointers may be used in place of a FIFO watermark. This reporting mechanism has the advantage of being invariant to partial fill modes as it tracks the difference in rates of cell consumption and production. Of course, for applications in which a FIFO watermark is not available, the previously-described technique based on separate counting of cell events may be used.

Another feature that may be incorporated in a buffer adaptive processor in a given embodiment of the invention is a frequency hold function. For example, if the AAL-1 processor reports a loss of clock, the output clock of the buffer adaptive processor can be stopped which will hold the digital PLL output clock frequency at its last value.

Figure 7:
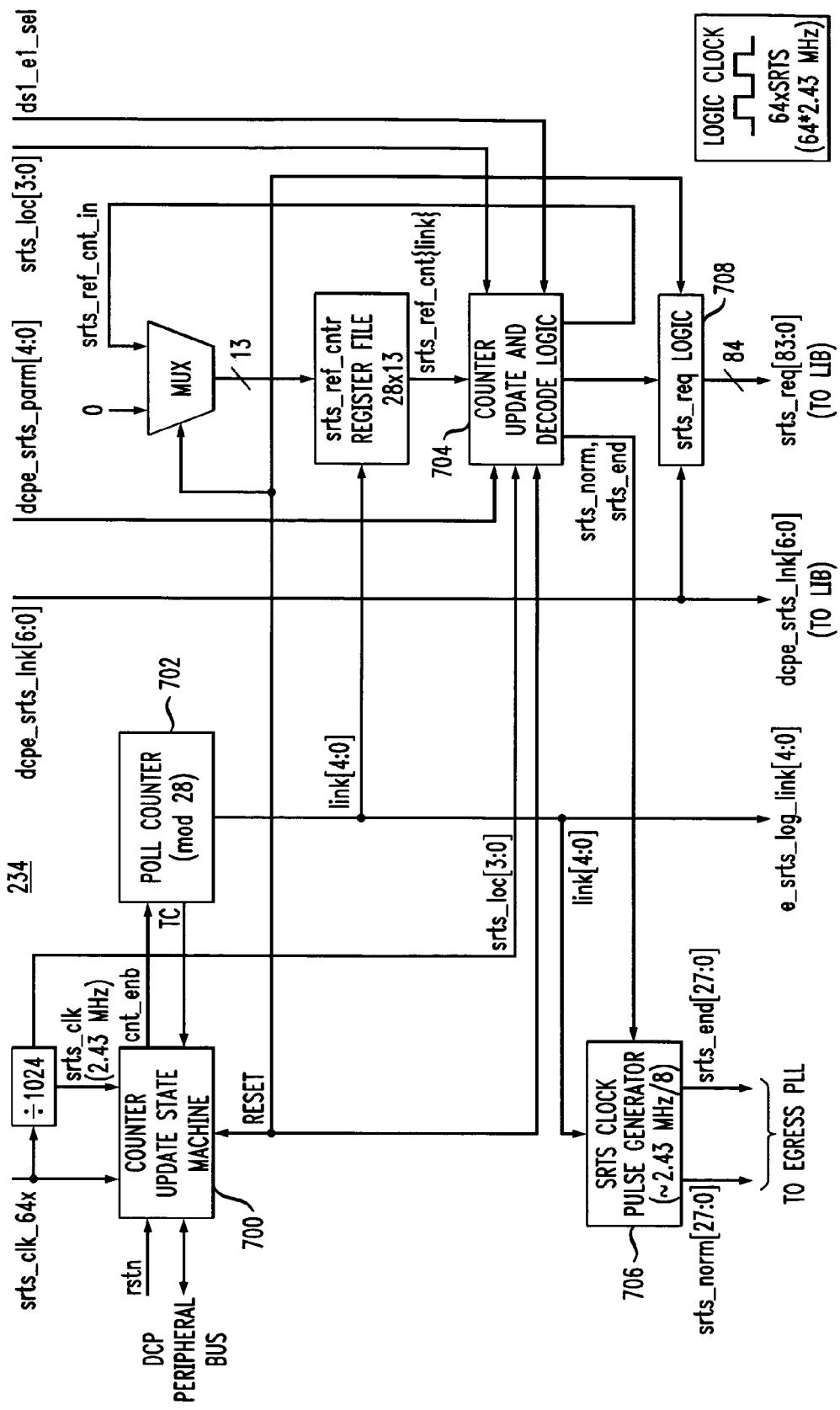
FIG. 7 shows a SRTS egress processor in the link layer processor of FIG. 2.

FIG. 7 shows the SRTS egress processor 234 of the link layer processor 102 in greater detail. The SRTS egress processor 234 implements a resource-shared SRTS implementation for 28-link clock recovery, generating clock phase state information which is used by the digital PLLs of the DCPs 200 for clock recovery. It provides a simple interface to an AAL-1 processor.

As is well known, the SRTS algorithm provides a mechanism for synchronizing the locally generated bit-rate link clock with the bit-rate link clock at the source. The link source periodically generates SRTS data (every 3008 bits) and sends this as part of an AAL-1 packet. The SRTS data contains a 4-bit residual divider reference that is used to control the phase and frequency of the locally generated bit-rate link clock. SRTS parameters are received from the AAL-1 processor via the LIB interface shown in FIG. 2. When the parameter from a link has been processed, the SRTS egress processor requests a new parameter from the AAL-1 processor via the LIB. The AAL-1 processor maintains a buffer of AAL-1 parameters with average depth of two SRTS messages in order to mitigate CDV induced SRTS under-runs to the SRTS egress processor.

The SRTS egress processor is designed to handle up to a ±400 ppm clock differential between source and destination, which translates to a ±200 ppm clock accuracy, that is, source and destination clocks with maximum error of ±200 ppm. The 400 ppm error assumes both source and destination clocks have maximum errors in opposite directions (e.g., source 200 ppm fast, destination 200 ppm slow or visa-versa.)

Given this differential, there can be as much as ±1.89 SRTS 2.43 MHz clocks in error over a 3008 bit SRTS interval for DS1. For E1, the SRTS clock error is ±1.43 clocks over the 3008 bit interval.

The SRTS egress processor as shown in FIG. 7 runs at 64 times the SRTS reference rate of 2.43 MHz, which allows the processor to be shared by 28 links and also allows two 64× clock periods per link to process each SRTS 2.43 MHz clock. The poll rate for each link is at the 2.43 MHz rate. A 13-bit SRTS reference counter is maintained for each link in a register file. In addition, a 4-bit local reference counter is maintained and shared by all links. Both counters increment at the 2.43 MHz rate.

The SRTS egress processor 234 generates update pulses to the input NCO. The update pulses instruct the input NCO to add either a normal update (nor_upd) or end update (end_upd) phase increment to the input NCO. This update process is designed to make the phase accumulation rate of the input NCO exactly equal to the NCO phase accumulation rate from the source. The PLL compares the input NCO phase accumulation rate with the output NCO phase accumulation rate and adjusts the output clock frequency such that the output rate matches the input phase accumulation rate. After lock is achieved, the output NCO bit-rate frequency will match the frequency of the source.

The input NCO processes phase updates at the bit clock frequency rate (1.544 MHz for DS1, 2.048 MHz for E1). Since the SRTS reference rate is faster than either of the rates, input NCO phase updates must be made at a rate that is a fraction (divide by N) of the DS1/E1 bit rate. The minimum N is dictated by the maximum input NCO phase update rate. If N is greater than or equal to 2, then the NCO phase update rate will not be exceeded since an update rate of 2.43/2=1.215 MHz is below the slowest input NCO update rate of 1.544 MHz.

Within a 3008-bit SRTS period there are $$M = \left\lfloor \frac{3008}{(DS1 \text{ or } E1)} * \frac{2.43e6}{N} \right\rfloor$$

normal updates and one end update. Since the number of update periods is not an integer, the last phase increment (end update) is over a shorter time period and therefore its associated phase increment, end update (end_upd), must be less than the normal update (nor_upd). The parameters end_upd and nor_upd are specified in the DCP Egress NCO register The second criteria for determining N, the SRTS divider, is related to the clock differential error calculations done above. During an SRTS period, there can be as much as 1.89 or 1.43 2.43 MHz clock drift for DS1 and E1 systems, respectively, due to frequency offset errors. We require M normal updates and 1 end update per 3008-bit SRTS cycle to meet the required input phase accumulation rate. A simple divide by N of the local 2.43 MHz clock determines the M normal updates. The single end update is issued whenever there is a match of the local 4-bit residual count with the residual count in the SRTS parameter from the source link. This match is done within a time window of the nominal SRTS clock count. The nominal SRTS count is $$SRTS_{NOM} = \text{round}\left(\frac{3008}{(DS1 \text{ or } E1)} * 2.43e6\right)$$

or 4734 and 3569 SRTS clocks for DS1 and E1 rates, respectively. In order to accommodate the match process, the window, from the above analysis, must be ±2 counts around the nominal SRTS clock count. If N were selected to be 8, then for E1 there would be 446 normal updates. For this case, nominal end update would occur within 1 SRTS clock as there is nominally 446*8+1 or 3569 SRTS clocks per SRTS period. If the end update search window was a ±2 SRTS clock, then the end update window would overlap a normal update period and it is conceivable for an SRTS period there may be 445 normal updates and one end update which would result in an incorrect input NCO phase accumulation rate. Therefore 2.43 MHz/8 is not an acceptable input NCO phase accumulator update rate. It is therefore a criteria that minimum interval between the last normal update and the end update be a minimum of two SRTS clocks. For hardware simplicity, we want to constrain N to be a power of two. The smallest N that meets the above criteria for both E1 and DS1 rates is 32.

The SRTS algorithm includes a processing loop which runs at the SRTS reference rate of 2.43 MHz. Each time a 2.43 MHz clock occurs, the reference counter in each link is incremented. If the reference counter, srts_ref_cnt_in[12:0], is evenly divisible by 32 (least significant 5-bits are zero) and the count is less than the end update window threshold, then a normal update pulse is generated for the associated link. If the update window threshold is met or exceeded, the current SRTS parameter, dcpe_srts_parm[4:0], is valid, based on the valid bit in dcpe_srts_parm[4], and the local SRTS reference divider, srts_loc[3:0], is equal to the residual count in dcpe_srts_parm[3:0], then an end update pulse is generated and the srts_ref cnt for the associated link is cleared. If the SRTS parameter is not valid (dcpe_srts_parm[4]==0), but the srts_ref_cnt_in is equal to the nominal SRTS count, then an end update pulse is generated and the srts_ref_cnt for the associated link is cleared. If the window threshold is exceeded and the parameter is valid, but the local residual count does not match the residual count in the SRTS parameter, then no update pulse is generated.

It is to be appreciated that the illustrative embodiment does not require the use of SRTS processing. The buffer adaptive egress processor 232 previously described may be used in place of the SRTS egress processor 234. Thus, alternative embodiments of the invention may include no SRTS processing circuitry at all.

Figure 8:
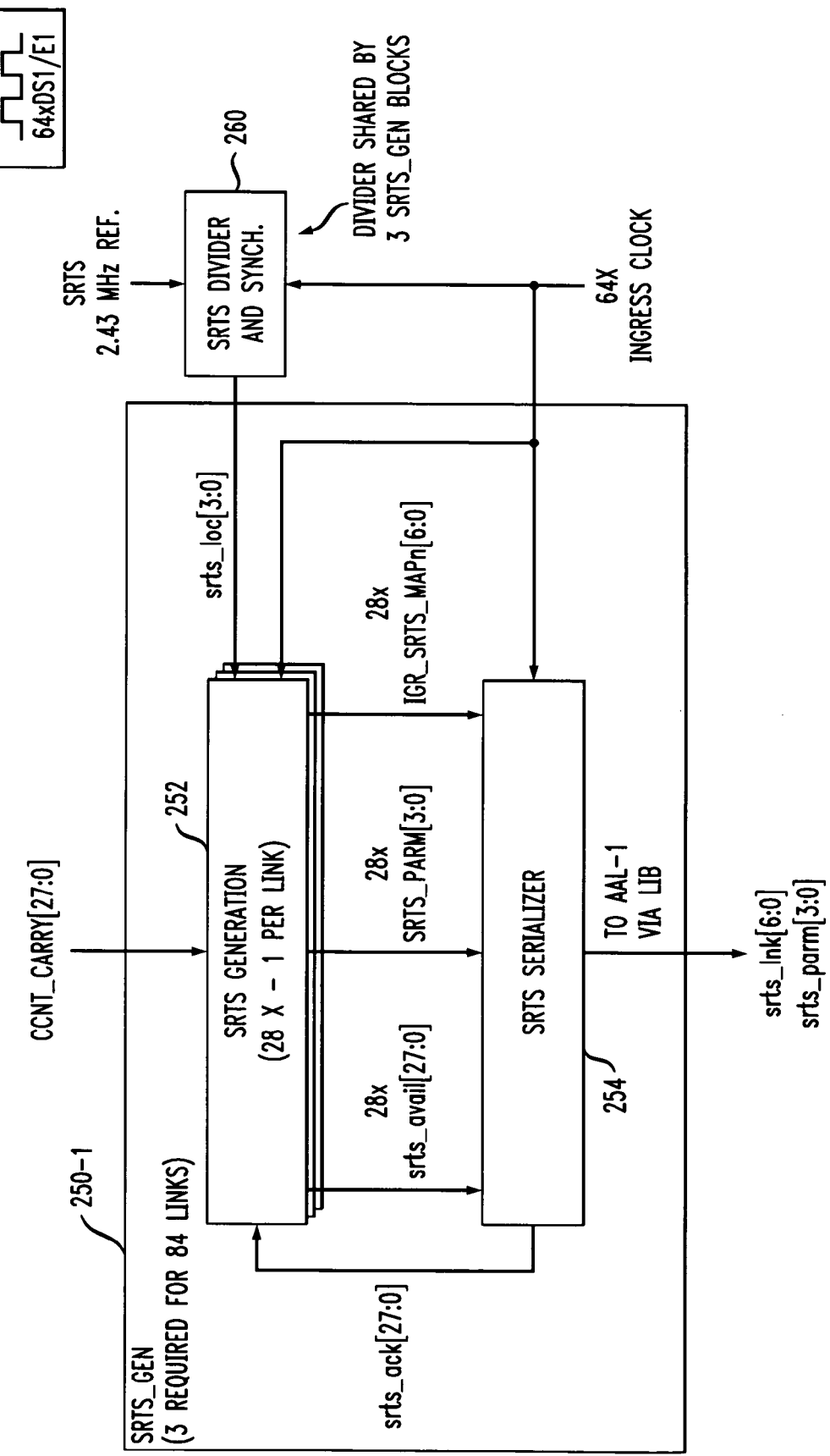
FIG. 8 shows a SRTS generator and serializer element in the link layer processor of FIG. 2.

With reference now to FIG. 8, a more detailed view is shown of a given one of the SRTS generator and serializer elements 250 in the link layer processor 102 of FIG. 2. There are a total of three such elements, each supporting 28 links, to provide support for the 84 ingress links of the illustrative embodiment. These SRTS generator and serializer elements are individually denoted 250-1, 250-2 and 250-3 in FIG. 2, but it is to be appreciated that each is configured in the manner shown in FIG. 8.

The SRTS generator and serializer element as shown in FIG. 8 generates SRTS parameters every 3008 data clocks as per standard SRTS operation. It includes 28 SRTS generators 252, driven by respective ones of the output NCO elements 212I of one of the ingress DCPs 200I. Utilizing the output NCO divider to support the SRTS generators 252 further reduces logic requirements. The SRTS divider and synchronizer 260 is shared by the three SRTS generator and serializer elements 250. It is driven by the 64× ingress clock, as is the SRTS serializer 254. The SRTS serializer 254 services all of the SRTS generators 252 using a round-robin approach.

The ingress SRTS processing generates time stamps relative to the common 2.43 MHz SRTS reference clock. The SRTS divider and synchronizer 260 provides the common time-stamp clock residual, srts_loc[3:0], which is shared by all of the SRTS generators 252. The 64× ingress clock is divided by 64 to form the 2.43 MHz SRTS reference clock. This clock is passed through a synchronizer to synchronize the clock to the 64×DS1/E1 domain. The synchronized SRTS clock is then divided by 16 to form the residual count that is used as the time stamp.

A given SRTS generator 252 counts input clocks from its assigned ingress link and generates a time-stamp parameter whenever 3008 clocks have been received. One SRTS generator is instantiated for each link that supports SRTS ingress processing. Normally a 12-bit counter is required to measure the 3008 bit SRTS interval. However, we can use the ccnt[11:0] of the output NCO to generate a clock pulse every 64-bit intervals. Since there are 3008/64=47 of these divide by 64 pulses in a 3008 SRTS interval, only a 6-bit counter is required for SRTS interval timing, reducing the SRTS interval counter in half. Since the NCO phase accumulator counts up to 128 bits before wrapping, its most significant bits can be used as part of the SRTS interval counter. A divide by 64 is decoded from the output NCO bit counter by using the output NCO ccnt phase accumulator carry from bit 11 to bit 12. This signal is asserted for a single 64×DS1/E1 clock period and is generated properly (no missing or extra clocks) during advance and retard output NCO operations. The divide by 64 may be pipelined without undermining SRTS operation.

The output of the SRTS serializer 254, which is delivered to the AAL-1 processor via an LIB interface, comprises SRTS link information denoted srts_lnk[6:0] and SRTS parameters denoted srts_parm[3:0]. With reference to FIG. 2, such information is shown more specifically on a per-bank basis, for example, as srts_lnk_bi[6:0] and srts_parm_val_bi, where i may be 0, 1 or 2.

The illustrative embodiments described above advantageously permit extensive resource sharing for high-link count clock filtering applications. The silicon area and associated power required to implement the link layer processor in the illustrative embodiments is reduced by an order of magnitude relative to conventional approaches. Also, the buffer adaptive and NCO phase update processing provide improved jitter performance. In addition, clock acquisition performance was improved using a dual PLL bandwidth which allows a glitchless transition from high loop bandwidth for fast acquisition to a low loop bandwidth for optimum de-jitter performance. Operational robustness was achieved with the clock loss detector which prevents the PLL NCO from rail frequency drifting when the reference clock source is interrupted.

A link layer processor or other link layer device in accordance with the invention may be implemented as an integrated circuit device suitable for installation on a line card or port card of a router or switch. Numerous other configurations are possible.

In a given integrated circuit implementation, identical die are typically formed in a repeated pattern on a surface of a semiconductor wafer. Each die includes an electrical source or other device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It should be noted that certain variables used in the description herein, such as N and M, are used differently in a number of different contexts. The particular usage intended in a given context will be readily apparent from other details of that context.

Again, it should be emphasized that the embodiments of the invention as described herein are intended to be illustrative only. For example, the particular arrangement of link layer device, physical layer device, network processor and other elements as shown in FIG. 1 may be varied in alternative embodiments. Also, the particular signals shown in the drawings and described above are presented by way of example, and those skilled in the art will recognize that alternative signal configurations may be used. Furthermore, although illustrated primarily in the context of processing ATM cells, the disclosed arrangements can be modified in a straightforward manner to accommodate traffic involving other types of packets or, more generally, other types of protocol data units. These and numerous other alternative embodiments within the scope of the following claims will be readily apparent to those skilled in the art.

What is claimed is:

1. A link layer device configured for processing data associated with a plurality of links including a plurality of ingress links and a plurality of egress links, the device comprising:
an ingress data clock processor configured to generate ingress clock signals for processing data associated with respective ones of said ingress links;
an egress data clock processor configured to generate egress clock signals for processing data associated with respective ones of said egress links; and
a control and configuration unit shared by the ingress data clock processor and the egress data clock processor;
wherein the control and configuration unit comprises a scheduler configured to control update operations for multiple phase-locked loops in each of the ingress and egress data clock processors; and
wherein the scheduler in controlling the update operations for the multiple phase-locked loops in each of the ingress and egress data clock processors controls a plurality of arithmetic logic units each of which implements at least respective portions of a plurality of the phase-locked loops in one of the ingress and egress data clock processors, said arithmetic logic units each processing respective assigned ones of the plurality of ingress links and the plurality of egress links for its associated plurality of phase-locked loops in a sequential fashion under control of the scheduler.

2. The device of claim 1 wherein the egress data clock processor is a single egress data clock processor configured to generate an egress clock signal for processing data associated with a set of egress links.

3. The device of claim 2 wherein the set of egress links comprises at least 28 egress links.

4. The device of claim 1 wherein the ingress data clock processor is one of a plurality of ingress data clock processors of the link layer device, said ingress data clock processors being configured to generate respective ingress clocks for processing data associated with respective sets of ingress links.

5. The device of claim 4 wherein each of the sets of ingress links comprises at least 28 ingress links.

6. The device of claim 1 wherein the control and configuration unit comprises a common control and timing logic unit and configuration memory.

7. The device of claim 1 wherein a given one of the arithmetic logic units comprises a state memory, an opcode decoder, an input numerically-controlled oscillator, a phase detector, and a loop filter.

8. The device of claim 1
wherein the control and configuration unit comprises a set of configuration registers for storing operation mode information and associated phase-locked loop parameter sets for each of the plurality of ingress links and the plurality of egress links.

9. The device of claim 8 wherein the control and configuration unit further comprises a plurality of configuration mode select multiplexers adapted to provide simultaneous fetching of multiple phase-locked loop parameter sets corresponding to respective ones of the plurality of ingress links and the plurality of egress links.

10. The device of claim 9 wherein the control and configuration unit further comprises a set of pipeline registers adapted to receive the multiple parameter sets from the configuration mode select multiplexers.

11. The device of claim 1 wherein the scheduler utilizes a scheduling period divided into a plurality of link processing intervals each including multiple phase detector poll operations.

12. The device of claim 1 wherein at least one of the data clock processors comprises an input numerically-controlled oscillator that is operative in a fractional mode with rounding.

13. The device of claim 1 wherein at least one of the data clock processors comprises a phase-locked loop having a dual bandwidth loop configuration.

14. The device of claim 1 wherein at least one of the data clock processors implements a loss of clock detection process which upon detection of a loss of clock inhibits phase-locked loop updates to prevent excessive output numerically-controlled oscillator drift.

15. The device of claim 1 further comprising a buffer adaptive egress processor.

16. The device of claim 15 wherein the buffer adaptive egress processor is coupled to at least one of the data clock processors;
wherein the buffer adaptive egress processor is configured to generate a rate clock for at least one of the data clock processors, based on protocol data units associated with one or more of the links, in a manner that limits variation in the rate clock responsive to delay variation between the protocol data units or loss of one or more of the protocol data units.

17. The device of claim 1 further comprising at least one of: (i) a SRTS egress processor; and (ii) a SRTS ingress processor having a SRTS generator and serializer element.

18. A system comprising:
one or more physical layer devices; and
a link layer device connectable to the one or more physical layer devices and configured for processing data associated with a plurality of links including a plurality of ingress links and a plurality of egress links, the link layer device comprising:
an ingress data clock processor configured to generate ingress clock signals for processing data associated with respective ones of said ingress links;
an egress data clock processor configured to generate egress clock signals for processing data associated with respective ones of said egress links; and
a control and configuration unit shared by the ingress data clock processor and the egress data clock processor;
wherein the control and configuration unit comprises a scheduler configured to control update operations for multiple phase-locked loops in each of the ingress and egress data clock processors; and
wherein the scheduler in controlling the update operations for the multiple phase-locked loops in each of the ingress and egress data clock processors controls a plurality of arithmetic logic units each of which implements at least respective portions of a plurality of the phase-locked loops in one of the ingress and egress data clock processors, said arithmetic logic units each processing respective assigned ones of the plurality of ingress links and the plurality of egress links for its associated plurality of phase-locked loops in a sequential fashion under control of the scheduler.

19. The system of claim 18 wherein the control and configuration unit comprises a set of configuration registers for storing operation mode information and associated phase-locked loop parameter sets for each of the plurality of ingress links and the plurality of egress links.

20. A link layer device configured for processing data associated with a plurality of links including a plurality of ingress links and a plurality of egress links, the device comprising:

an ingress data clock processor configured to generate ingress clock signals for processing data associated with respective ones of said ingress links;

an egress data clock processor configured to generate egress clock signals for processing data associated with respective ones of said egress links; and a control and configuration unit shared by the ingress data clock processor and the egress data clock processor;

wherein the control and configuration unit comprises a set of configuration registers for storing operation mode information and associated phase-locked loop parameter sets for each of the plurality of ingress links and the plurality of egress links;

wherein the control and configuration unit further comprises a plurality of configuration mode select multiplexers adapted to provide simultaneous fetching of multiple phase-locked loop parameter sets corresponding to respective ones of the plurality of ingress links and the plurality of egress links; and wherein the control and configuration unit further comprises a set of pipeline registers adapted to receive the multiple parameter sets from the configuration mode select multiplexers.

* * * * *